United States Patent [19]

Mullerheim et al.

[11] 4,229,202
[45] * Oct. 21, 1980

[54] WASTEWATER TREATMENT WITH ULTRAVIOLET DISINFECTION AND INCREASED CAPACITY

[75] Inventors: Steven B. Mullerheim, Walnut Creek; Fred G. Williams, San Anselmo, both of Calif.

[73] Assignee: Great Circle Associates, Walnut Creek, Calif.

[*] Notice: The portion of the term of this patent subsequent to Jan. 30, 1996, has been disclaimed.

[21] Appl. No.: 7,209

[22] Filed: Jan. 29, 1979

Related U.S. Application Data

[63] Continuation-in-part of Ser. No. 752,201, Dec. 20, 1976, Pat. No. 4,137,062.

[51] Int. Cl.² ............................ C02C 1/00; C02C 1/40
[52] U.S. Cl. ................................... 71/8; 71/12; 71/64 C; 210/97; 210/170; 210/259; 210/387; 210/406; 422/24; 210/760; 210/764; 210/768; 210/805
[58] Field of Search .................... 71/8, 9, 10, 12, 64 C; 422/24; 210/17, 18, 10, 63 R, 63 Z, 64, 66, 65, 67, 77, 85, 97, 98, 100, 105, 104, 107, 116, 123, 127, 128, 129, 137, 152, 143, 170, 196, 254, 257 R, 258, 259, 387, 401, 406, 532 S, 416 R

[56] References Cited

U.S. PATENT DOCUMENTS

| | | | |
|---|---|---|---|
| 1,760,314 | 5/1930 | Murrey | 210/170 |
| 2,736,434 | 2/1956 | Yacoe | 210/178 |
| 2,751,087 | 6/1956 | Wallquist | 210/123 |
| 2,867,324 | 1/1959 | Hirs | 210/97 |
| 3,083,831 | 4/1963 | Fowler | 210/111 |
| 3,404,779 | 10/1968 | Weather | 210/387 |
| 3,559,807 | 2/1971 | Reilly | 210/152 |
| 3,618,772 | 11/1971 | Dietrick | 210/137 |
| 3,681,236 | 8/1972 | Bergles | 210/532 S |
| 3,690,466 | 9/1972 | Lee | 210/406 |
| 3,747,766 | 7/1973 | Brooks | 210/259 |
| 3,914,173 | 10/1975 | Call | 210/64 |
| 3,915,859 | 10/1975 | Sundin | 210/104 |
| 3,948,772 | 4/1976 | Ellner | 422/24 |
| 4,012,219 | 3/1977 | Josephs | 71/9 |
| 4,042,497 | 8/1977 | Maltby | 210/104 |
| 4,137,062 | 1/1979 | Mullerheim | 71/9 |
| 4,141,830 | 2/1979 | Last | 210/64 |

FOREIGN PATENT DOCUMENTS

933307 9/1973 Canada ................................. 204/160.1
2527009 12/1976 Fed. Rep. of Germany ............ 210/64

Primary Examiner—Ernest G. Therkorn
Attorney, Agent, or Firm—Owen, Wickersham & Erickson

[57] ABSTRACT

A method and an apparatus for treating wastewater such as sewage are disclosed. Designed principally for complete on-site wastewater treatment and disposal, the system separates wastewater into liquid wastes and solid wastes by filtration, treats the liquid wastes with ultraviolet radiation and disperses them into unsaturated ground. The solid wastes are periodically removed, along with used portions of the paper filter medium and delivered, in the case of sewage, to a composting area where the solids can be composted. A preferred embodiment includes the use of ultraviolet radiation having wavelengths effective both to destroy pathogens directly and to produce ozone from entrained air in the liquid filtrate, to react with pathogens to form stable compounds. An alternate embodiment of a wastewater delivery and filtration suction subsystem is disclosed, whereby filtration is made continuous and capacity is approximately doubled.

31 Claims, 6 Drawing Figures

WASTEWATER TREATMENT WITH ULTRAVIOLET DISINFECTION AND INCREASED CAPACITY

REFERENCE TO RELATED APPLICATION

This application is a continuation-in-part of copending application Ser. No. 752,201, now U.S. Pat. No. 4,137,062.

BACKGROUND OF THE INVENTION

The invention relates to wastewater treatment, and more particularly to an efficient on-site wastewater treatment and disposal method and apparatus utilizing filtration and ultraviolet disinfection.

Various systems have been used for treatment of residential and other wastes. In cities there have typically been central sewage treatment facilities for water-borne solid and liquid wastes conducted thereto from residences and other sources. Generally these systems have included separation of the solids from the liquids, sometimes by settlement and sometimes by filtration. However, separation at this stage is only partially effective, since the solids and liquids have become nearly homogenized in transit. Such "separated" solids have often been subsequently subjected to a drying operation. See, for example, U.S. Pat. Nos. 2,736,434 and 3,559,807.

The liquids from such sewage treatment, which at this point carry many substances from the solids, have usually been chemically treated to the point that they can be returned to the soil or to flowing water. The solids have generally been either buried or composted. Composting of sewage solids at this stage is nearly always anaerobic, since anaerobic decomposition has already begun as the wastes have travelled through sewage lines to the treatment facility. This precludes aerobic composting, which often is desirable and feasible, for producing a useful compost without contaminating the surrounding air.

One type of on-site sewage filtration apparatus has been suggested in U.S. Pat. No. 3,747,766. That apparatus was intended to separate solid wastes from liquid wastes soon after their exit from households or other sources. However, the system of the patent was completely closed, with no provision for aerobic composting of solids. The final treatment of the solids was to be dehydration and/or burning. This type treatment is not only costly but also wasteful of the soil conditioning product that can be derived from aerobic composting.

The aforementioned U.S. Pat. No. 3,559,807 discloses a conveyor-type filtering device which is in some respects similar to a filtering apparatus of the present invention. However, the filtering device of that patent does not include several particularly advantageous features of the present invention, and it is shown for use with solid material drying and burning apparatus.

In connection with filtration sewage treatment, there has been a need for an efficient and inexpensive means of disinfecting the liquid filtrate, without destruction of nutrients, so that with minimal treatment it can be dispersed to soil as a beneficial supplement.

There has been a need for an efficient, compact, and reliable wastewater separation and treatment apparatus in several areas of application in addition to sewage treatment. For example, in the food processing industry large quantities of water bearing organic materials must be separated from such materials at least to the point that the water can be safely returned to the soil. Similar problems exist with other industrial water-borne wastes. In industrial air pollution reduction equipment, solid pollutants are often ultimately carried by water. This water should be separated from the solids and purified before it is introduced to the soil or flowing water.

SUMMARY OF THE INVENTION

The invention described herein is an on-site wastewater treatment and disposal system adaptable for many liquid separation applications, and particularly suited for sewage treatment for private dwellings or groups of dwellings. The basic principles of the invention are as follows:

While the wastewater or sewage is still fresh, solids are immediately separated from the wastewater input by a paper filter which is dispensed by a sequentially advanced continuous roll, formed into an input trough and exhausted of its filtrate by a suction applied from below.

The trapped solids and paper filter are conveyed to a composting area where they are allowed to decompose by natural biological processes.

The filtrate is exposed to ultraviolet radiation to kill organisms directly and also preferably to produce ozone in the filtrate, for reaction with organisms to produce harmless, stable compounds. The disinfected filtrate is applied to unsaturated ground, beneficially adding nitrogen to the soil.

By the means disclosed, a number of unique and highly beneficial results are obtained over previous wastewater processing systems:

Solids are removed soon after their entry into the wastewater flow, before significant pathogen growth and while the solids still have a high degree of structural integrity and have not become "homogenized" with the liquids, which ordinarily happens in prolonged wastewater transit. This immediate filtration with a very efficient disposable filter allows for a highly filtered filtrate virtually free of suspended solids, low in bacteria, easily pumped, and readily disinfected.

The almost total extraction of wastewater contaminants with the filter limits the need for process decontamination to a fraction of the original wastewater volume. Thus, unlike conventional sewage treatment processes, no large tanks are needed for biological digestion of contaminants in solution.

Composting of the paper with dewatered solids by either aerobic or anaerobic means provides an energy-efficient, non-polluting and reliable method for decontaminating the solids for return to the ecosphere. Where aerobic means are used, sewage solids can be integrated with other organic solid wastes for optimized composting of both.

The system lends itself extremely well to the use of ultraviolet radiation to disinfect the liquid filtrate, destroying pathogens and controlling regrowth. The ultraviolet treatment is energy-efficient, since the energy emitted is only used to destroy organisms, and not to enter into energy-absorbing chemical reactions. Conversely, disinfectants which work purely by oxidation, such as chlorine, hydrogen peroxide, and iodine are inefficient in disinfecting effluents with high nutrient content since their chemical energy is largely wasted in reactions with the nutrients. Ultraviolet radiation, unlike chlorine, is highly efficient in killing viruses, even more so than in killing bacteria. The ultraviolet utilized for the invention includes a wavelength effective to directly kill pathogens by destroying the DNA of the organism, known as "germicidal" wavelength ultraviolet. It also preferably includes an ozone-producing wavelength, which acts on the pathogens by a different means: production of ozone from entrained air in the filtrate liquid, resulting in the formation of stable compounds from pathogens, and the addition of residual hydrogen peroxide to the filtrate to deter pathogen regrowth. The two types of ultraviolet treatment act in concert to disinfect the filtrate more thoroughly and efficiently than the sum of their effects taken separately. The nutrients of the filtrate liquid are left in a form useful as a beneficial soil supplement. Ultraviolet treatment is particularly advantageous with this system because the filtration employed removes nearly all suspended solids, unlike settling processes, making the filtrate clearer and permitting more thorough penetration of the ultraviolet light, resulting in more efficient treatment of the filtrate. Also, the apparatus and method of the invention provide for the ultraviolet treatment immediately after filtration, before growth of organisms and turbidity can occur, and while there is significant entrained air in the filtrate for the production of ozone. This also provides for treatment at a location where the liquid flow rate is slow, for better irradiation. Suction applied to the filtration further increases entrained air in the filtrate, enhancing ozone production.

The dissolved solids present in the disinfected filtrate, in the case of sewage, are primarily phosphates, alkyl benzyl sulfonates and organic nitrogen compounds, all of which are readily and productively absorbed by vegetation through the assistance of microorganisms. Nitrogen present in urine, which constitutes over 80% of the nitrogen in human waste, is preserved by this process in a liquid fertilizer; other aerobic and composting systems dissipate most of this nitrogen to the atmosphere as ammonia gas.

The disinfected filtrate, being virtually free of suspended solids and thoroughly disinfected, can be readily transported by narrow diameter pressurized pipe and dispersed to unsaturated ground through trickle irrigation, spray irrigation, or furrow irrigation with little danger of soil clogging or orifice clogging.

This system, unlike many proposed on-site processing systems, can be installed into existing homes without changing any of the existing plumbing fixtures. Both sanitary and washing wastewaters are processed with no need for separate handling of the two. The system may also be easily installed at existing industrial sites for separating and treating non-sewage wastewaters bearing solids. In fact, it is highly adaptable to the food processing industry, where organic materials are carried in wastewater, and also to the reclamation of water from polluted-air cleansing "scrubbers" which pick up solids from the air they cleanse. For new homes, the installation of the on-site system can save considerably in piping costs.

Thus, in one embodiment the process of the invention comprises separating the solids from the liquids while the sewage is fresh, and producing a liquid component low in suspended solid material; exposing the liquid component to ultraviolet radiation including germicidal wavelength, to destroy pathogens but not beneficial nutrients present in the liquid component; introducing ozone in the liquid component to react with pathogens to form stable compounds and to produce residual hydrogen peroxide for deterring subsequent pathogen growth; and dispersing the nutrient-rich treated liquid component to unsaturated ground.

In another embodiment, the invention has certain modifications to a wastewater delivery subsystem, whereby filtration and pump operation are made continuous and the capacity of the system is approximately doubled. The modification involves duplication of a few tank and valve components, increasing cost and space requirements less than 20 percent. In addition, the system is readily adaptable to a modular arrangement whereby the capacity may be doubled simply by adding a few modular components and adjusting the control sequence.

Thus, according to the second embodiment, the process of the invention comprises a continuous filtration process involving duplicate filtrate or power reservoirs, including pumping stored filtrate from the first reservoir to create a suction; connecting that reservoir with the holding or buffer tank to draw a charge of wastewater into the holding tank; releasing the charge to the filter medium; disconnecting the first reservoir from the holding tank and connecting it to the filtrate side of the filter medium to apply suction thereto and draw filtrate into the first reservoir; while filtration proceeds, pumping stored filtrate from the second reservoir to create a suction therein; connecting the second reservoir to the holding tank and drawing a second charge of wastewater thereto; releasing the second charge to the filter medium; while filtration continues, disconnecting the second reservoir from the holding tank and switching the filtrate side of the medium from the first to the second tank as a source of suction; and thence repeating the cycle.

Accordingly, some of the objects of the invention are as follows:

(1) To provide a means for conveying wastewater to a filtration station and filtering through a paper filter;

(2) To provide a hydraulic/pneumatic subsystem consisting of one pump, several reservoirs, and several inexpensive valves to supply storage of incoming wastewater, pneumatic lift of wastewater to the paper filter, suction to the filtrate side of the filter, and hydraulic pressure for the treated liquid;

(3) To provide efficient ultraviolet treatment of the liquid filtrate, soon after filtration, for complete disinfection of the filtrate with minimal energy requirements; and (4) To provide for continuous filtration and approximate doubling of the system's capacity where desired, through addition of modular, interchangeable components.

These and other objects, advantages, and features of the invention will be apparent from the following description of a preferred embodiment, taken in conjunction with the drawings.

DESCRIPTION OF THE PREFERRED EMBODIMENTS

Figure 1:
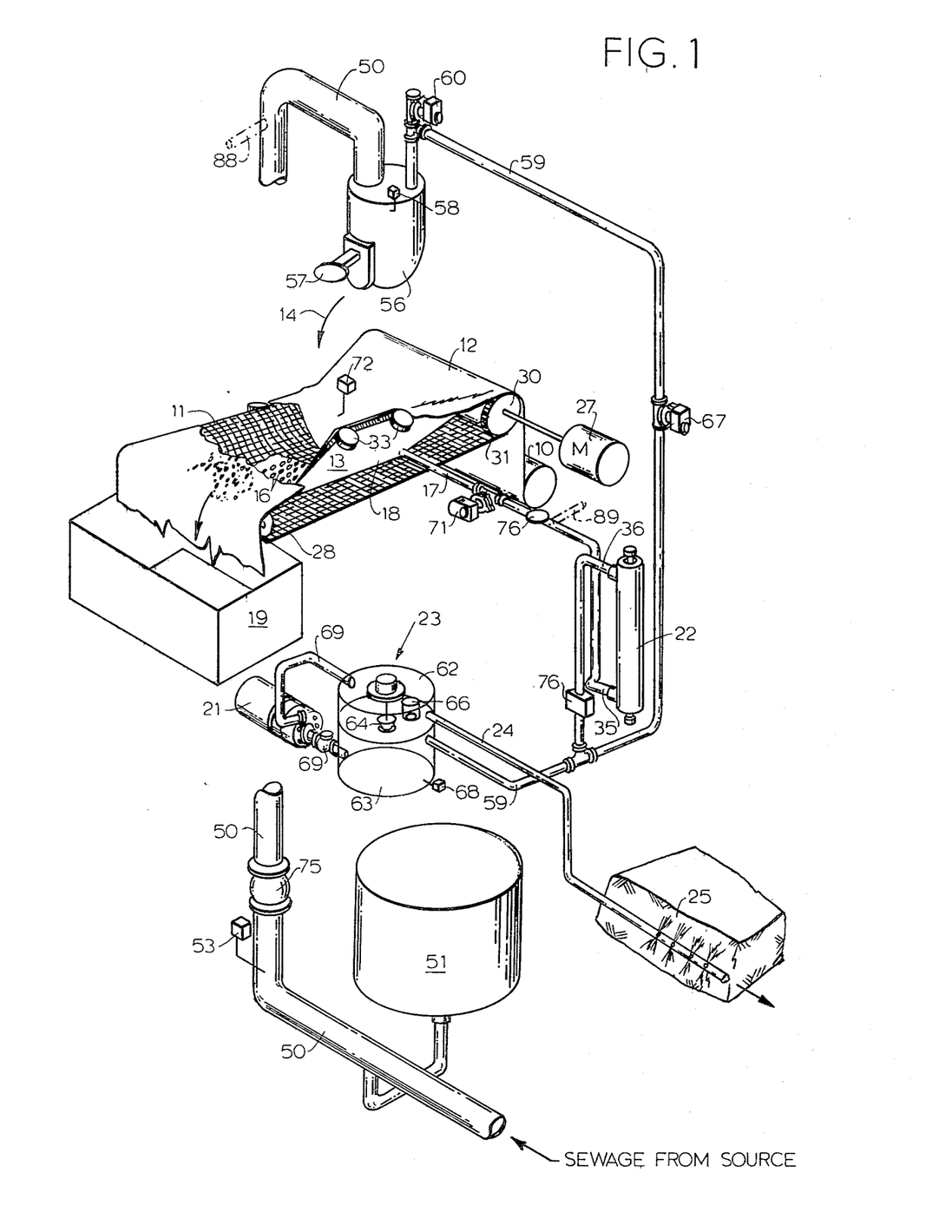
FIG. 1 is a schematic perspective view indicating the process and apparatus of the invention.

The basic components of the invention are shown in the schematic perspective view of FIG. 1. Shown is a paper roll dispenser 10, which, by means of a porous, perforated, or otherwise foraminous belt conveyor 11, feeds filter paper 12 to a trough 13 which accepts input wastewater indicated by arrow 14, from a wastewater delivery system including a buffer reservoir 15. The filtering trough 13 discharges output filtrate through a perforated bottom 16 and a suction tube 17 connected to a catch basin 18 below the perforated bottom.

The paper with trapped solids intermittently advances when the filter paper 12 becomes clogged, parting from the conveyor 11 and being dumped into a composting area 19 where the solids and paper 12 are allowed to decompose by natural biological processes. Filtered output wastewater is delivered by a pump 21, after treatment by an ultraviolet disinfection unit 22, which preferably includes ozone treatment, from a reservoir system 23 through a conduit 24 to unsaturated ground 25. Filtered-out solids 26 are shown exiting the trough 13 in FIG. 1, as part of the fresh wastewater which may comprise domestic sewage. The freshness of the wastewater is important, and filtration occurs as soon as possible after the wastewater leaves its source, so that liquids and solids are not significantly comingled and homogenized from transport and so that pathogens have had little chance to grow.

FIG. 1 indicates some of the construction of the conveyor and trough apparatus 11-13, which is essentially as described in our copending application Ser. No. 752,201, now U.S. Pat. No. 4,137,062. The conveyor 11 is a supporting net bonded to edge-mounted gear belts 28. A motor 27 drives a power drum 30 with geared edges 31 for power transfer, the conveyor net being also supported by a front roller 32 and edge guiding and supporting gear rollers 33, for supporting the filter paper 12 in the trough 13 and for advancing the paper when necessary. The conveyor net separates the filter paper from the trough at discrete points, which prevents clinging and lifts the paper from the trough when tractive power is applied for paper advancement.

A central depression is formed in the conveyor net 11, conforming generally to the interior of the trough 13, whose perforated bottom 16 is lower than either the front or the back, i.e., the level of the rollers 30 and 32. The weight of a charge of wastewater on a section of filter paper over the net conforms the net and paper fully to the trough.

Details of the function, purpose and construction of the conveyor and trough filtering apparatus are discussed in our above-cited U.S. Pat. No. 4,137,062.

As FIG. 1 indicates, liquid filtrate drawn by suction through the filter paper 12 and out of the catch basin 18 through the suction line 17 is passed through an ultraviolet disinfection unit 22, which preferably includes ozone treatment. The filtrate enters the unit through a lower inlet 35 and exits, disinfected, through an upper outlet 36. The positioning of the unit 22 just below the filtration operation, in the suction line, and the location of the inlet 35 at the bottom assure that the filtrate will pass through the unit 22 at a low velocity, for maximum treatment by the ultraviolet radiation. The ultraviolet disinfection unit 22 is further discussed below in connection with FIGS. 3 and 4.

Figure 2:
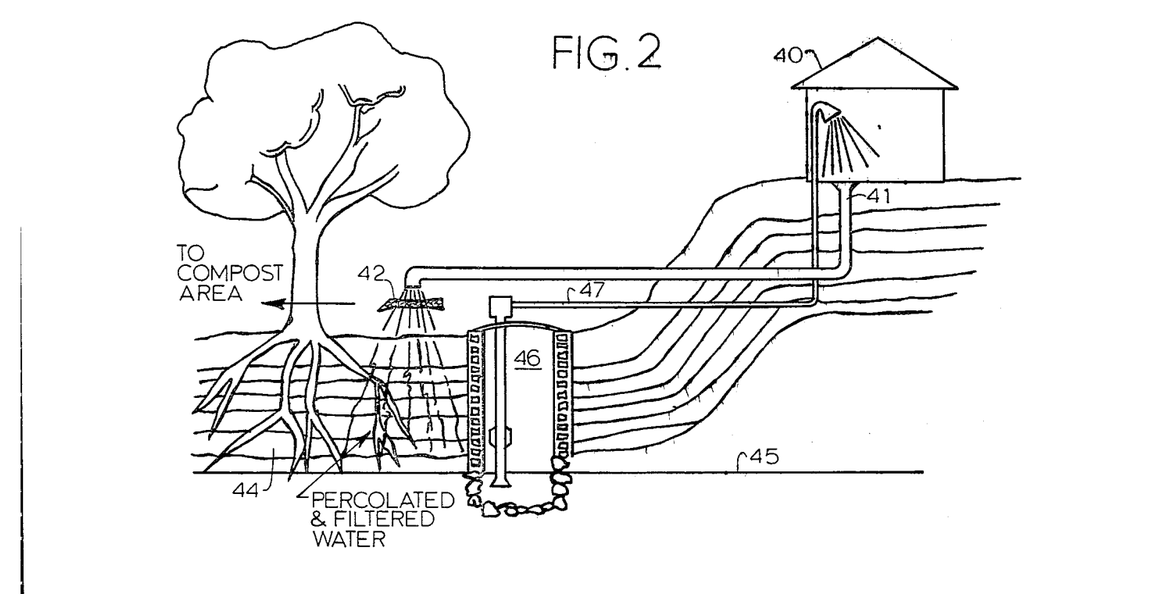
FIG. 2 is an elevational representation illustrating recycling of household sewage water according to the invention.
Figure 3:
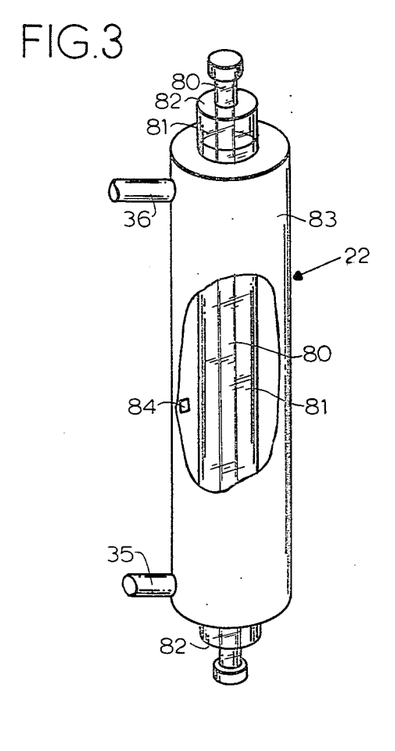
FIG. 3 is a schematic perspective view showing an ultraviolet disinfection process and apparatus included in the invention and also indicated in FIG. 1.
Figure 4:
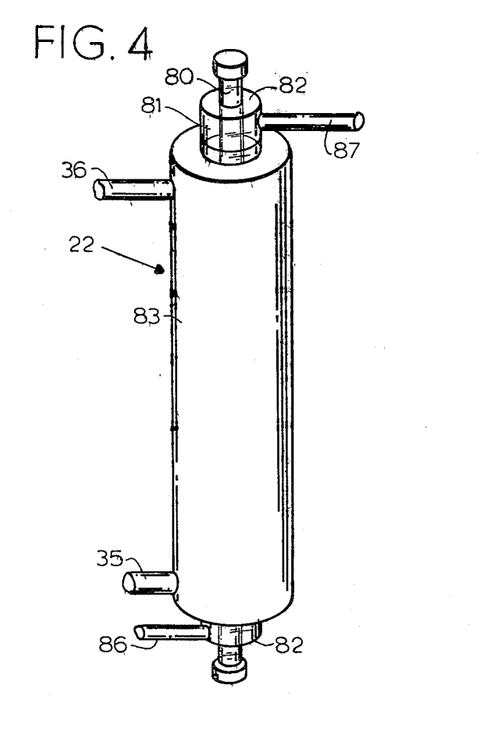
FIG. 4 is a view of the ultraviolet treatment apparatus shown in FIG. 3, but with a modification for drawing off ozone for injection at a point upstream in the process.

FIG. 2 illustrates a principle of the invention by which used household water is returned to the soil and ultimately back to the household as purified water. Water which has been used in a dwelling 40 passes through a sewer line 41, along with liquid and solid wastes, to filtering apparatus 42 of the invention. There the solids are removed from the liquids and transported to a composting area. The water and liquid wastes, after being treated by the ultraviolet unit 22 shown in FIGS. 1, 3 and 4, are dispersed into unsaturated ground 43, where they slowly percolate down through subsoil and aquifers 44. Thus, when these liquids reach the water table 45, they have been further purified by natural filtration and biologic processes of the ground, and may be again consumed by inhabitants of the dwelling 40. Along with other ground water, the purified water enters a well 46 and is recycled into the dwelling through a fresh water pipe 47.

This is an example of water purification and recycling at or near the use site. Of course the re-use need not be at the same site; recycling actually occurs, in a sense, whenever water and liquid wastes are returned to the soil. In many applications, the nutrient-rich liquid filtrate is used for irrigation, as indicated in FIG. 1. Since solids have been removed and agglomeration of pathogen growth is prevented by the treatment, the filtrate may be transported through narrow-diameter pipe to the place of use.

It is mandatory that input wastewater be stored temporarily in a reservoir before being fed to the filter trough, both to prevent overloading of the filter's capacity on a surge basis, and also to provide high capacity storage in case of a power outage or other failure. This reservoir will need to be located below the wastewater source level in order that it can be feed by gravity flow from a gravity wastewater pipe or network.

Wastewater must be transferred by some means from the reservoir to the filter, preferably in metered quantities, and this is done by a wastewater delivery system schematically indicated in FIG. 1, and also described in our above-referenced U.S. Pat. No. 4,137,062. The transfer should occur with minimal agitation since such agitation would disperse the solids in the wastewater and make filtration more laborious for the paper filter, particularly in the case of domestic sewage. The use of a liquid pump for such transfer is therefore undesirable. Other methods of effecting such transfer are gravity feed and pneumatic pressure. If gravity feed is used, the trough will have to be physically located below the reservoir, necessitating a very deep unit and rendering the trough very inaccessible.

Gravity feed also necessitates the use of a rugged, power-actuated valve of at least 3" aperture to meter the wastewater, which may contain large solids, to the paper trough below. Such a valve is costly, and is unnecessary if pneumatic feed is used.

One of the features of the invention is a novel, inexpensive, and failure-resistant hydraulic/pneumatic system for providing, using only one centrifugal liquid pump and several inexpensive valves, pneumatic lift of the wastewater to the trough, suction of filtrate through the paper filter, and hydraulic pressure to the processed liquid. This wastewater delivery system is particularly advantageous with the ultraviolet filtrate disinfection apparatus described below, located in the filtrate suction line. The system utilizes a batch process which is readily controlled by a simple digital electronic control system triggered by level switches and timing circuits, and involves a minimal number of moving parts. The hydraulic/pneumatic system is illustrated is illustrated in FIG. 1. An input wastewater pipe 50 leads from a source of fresh sewage, preferably via an input surge reservoir 51, to the buffer reservoir 15. An input liquid level sensing switch 53 indicates when there is an adequate volume of wastewater in the system for one or more treatment cycles. A flap valve 56 at the lower end of the reservoir 15 is normally held closed by a counterweight 57. The buffer reservoir 15 also includes a buffer liquid level switch 58, and is connected at or near its top to a buffer suction line 59 connected to a buffer vent valve 60, which may be positioned as shown or at any location near the top of the reservoir 15. The reservoir system 23 includes an upper or return reservoir 62 and a lower or power reservoir 63, the latter of which receives filtrate through the filtrate line 17 and the buffer suction line 59 as indicated in FIG. 1. The reservoir system 23 includes a return or dump valve 64 between the upper and lower reservoirs, operated by a solenoid 65. The dump valve 64 returns a portion of the liquid filtrate from the upper reservoir to the lower reservoir during a portion of the operating cycle, as explained below. This type dump valve is simple and preferred, but an alternate arrangement would suffice, such as an external valved conduit (not shown) connecting the two reservoirs. When the dump valve is activated, it is preferable that both the upper and lower reservoirs be vented. Thus, the upper reservoir 62 may be normally open at its top via a floating ball valve 66 which closes only when the upper reservoir is nearly full. For venting the lower reservoir during liquid return, the buffer vent valve 60 and a buffer suction valve 67 in the line may be opened briefly.

Also positioned between the two reservoirs 63 and 62 is the pump 21, preferably a centrifugal pump, connected by conduits 69 to the respective reservoirs, the pump 21 being positioned to pump liquid from the lower (power) reservoir 63 into the upper (return) reservoir 62. Liquid pumped into the upper reservoir, after filling that reservoir (and closing the ball valve 66) passes out the outlet conduit 24 to be dispensed to the ground. A liquid level sensing switch 68 determines when the lower reservoir 63 has been drained by the pump 21.

As indicated, the buffer suction valve 67 is positioned in the buffer suction line 59 to selectively connect the buffer reservoir 15 with the upper part of the lower, or power 9 reservoir 63, near its top. Similarly, a trough suction valve 71 is positioned in the trough suction/-drain line 17 to selectively connect the trough catch basin 18 with the reservoir 63, via the lower end of the line 59. A liquid level sensing switch 72 is positioned in the trough 13, slightly above the perforated bottom 16. The liquid output conduit 24 extends from the upper part of the upper reservoir 62.

The pneumatic/hydraulic wastewater delivery system described is essentially the same as described in our copending application Ser. No. 752,201, now U.S. Pat. No. 4,137,062, except for certain details, and the function described below is also similar.

In the quiescent state, the power or lower reservoir 63 is filled with filtered and disinfected liquid wastewater. The solenoid operated valves 71, 67 and 60 preferably are normally open and the flap valve 56 is held closed by the counterweight 57. The dump valve 64 is held closed by its own weight reinforced by a small head of filtered liquid remaining in the return reservoir 62.

The processing cycle is started when incoming wastewater flows down the input pipe 50 and is of sufficient quantity to actuate the liquid level switch 53. The trough suction valve 71 and the buffer vent valve 60 are then closed and the centrifugal pump 21 is started, causing liquid to be pumped out of the power reservoir 63 and into the return reservoir 62. Exhaustion of liquid from the power reservoir 63 creates a vacuum in the upper portion of this reservoir, thereby causing a suction to be conveyed from the reservoir through the buffer suction line 59 and the opened valve 67 to the buffer reservoir 15. This suction in turn causes incoming wastewater to be lifted up the riser pipe 50 into the buffer reservoir 15.

As indicated in FIG. 1, a check valve 75 is preferably included in the ascending portion of the wastewater input pipe 50, just above the level sensor 53. This prevents the excess sewage which has been lifted in the pipe from falling back to the level of the remaining sewage in the surge tank 51 after each charge of sewage is brought into the buffer reservoir 15. The check valve 75 is preferably a simple flap valve, so that problems of clogging and breakup of solids are avoided. Through the provision of this valve, suction is conserved, since less wastewater lifting normally is required, and more suction is available for the filtration operation, described below.

When sufficient wastewater has filled the buffer reservoir 15 to actuate the buffer liquid level switch 58, the valve 67 is closed, thereby sealing off the power reservoir 63, and the buffer vent valve 60 is opened, thereby releasing the suction in the upper portion of the suction line 59. The counterweight 57 is so adjusted that the wastewater filling the buffer reservoir 55 is of sufficient head to overcome its weight when suction is removed, and the flap valve 56 therefore opens, dumping substantially all of the contents of the buffer reservoir 55 into the paper filter 12 positioned in the filter trough 13 below.

Continued pumping by the pump 21 causes an increase in vacuum stored in the power reservoir 63. Meanwhile, excess liquid pumped into the return reservoir 62 is pumped out the outlet conduit 24 to be dispersed into the soil. When the liquid level in the power reservoir 63 has been reduced to the threshold of the liquid level sensor 68, the pump 21 is turned off and the solenoid operated trough suction valve 71 is opened. The accumulated vacuum of the reservoir 63 then causes a suction to be applied to the trough 13 through the opened valve 71 and the trough drain pipe 17. Wastewater thus commences to be filtered under suction through the paper in the trough 13, with the filtrate flowing into the power reservoir 63. The return reservoir 62, which is somewhat smaller than the reservoir 63, is at this point full to the level of the outlet 24.

When the liquid in the trough 13 has receded to below the threshold of the liquid level switch 72, the switch is actuated. At this point, the power reservoir 63 has been partially refilled by filtrate. After a small delay to allow for complete exhaustion of liquid from the trough (the sensing switch 74 is slightly above the trough bottom 16), the valve 67 is opened, thereby venting the power reservoir 63 to the atmosphere through the opened valve 60 and the suction line 59. The return reservoir dump valve 64 is then momentarily actuated by the solenoid 65. Venting of this upper reservoir is accomplished by the ball valve 66. The valve 64 stays open until most of the liquid in the return reservoir 62 has drained back into the power reservoir 63, whereupon the reservoir 63 becomes nearly filled again. The processing cycle ends when the return reservoir 62 is nearly empty.

Disinfection of the liquid filtrate is accomplished as it passes through the ultraviolet unit 22 positioned within the suction/filtrate line 17. This operation is described further below.

Disinfected, filtered wastewater is discharged from the outlet 24 under pressure during the final portion of the pumping cycle, once the return reservoir 62 has filled to the level of the outlet 24. The quantity of liquid pumped out will be approximately that dumped into the trough 13 by the buffer reservoir 15.

During each process cycle, the pump 21 pumps more liquid than is discharged from the outlet 24, with the difference being that quantity of liquid temporarily stored in and later returned by the return reservoir 62 to the power reservoir 63. The function of this added increment of pumping is to provide a reserve of suction (1) to lift wastewater into the buffer reservoir 15 through the pipe 50; (2) to provide filtering suction for the trough; and (3) to make up for any liquid or pneumatic losses that may occur during the cycle. Theoretically, the added increment of pumping and the upper reservoir 62 itself could be eliminated entirely if the wastewater pipe 50 went through only a short ascent to the buffer reservoir 15, the volume of liquids in the wastewater were consistent enough, and there were no pneumatic losses. However, to provide sufficient versatility in the wastewater treating apparatus, the inclusion of the upper or return reservoir 62 and the added pumping is preferred.

By its operation as both a vacuum pump and a filtrate discharge pump, the pump 21, in conjunction with the described arrangement of valves, suction lines and reservoirs, serves functions which would normally require two or three pumps. The system illustrated in FIG. 1 utilizes gravity and a single pump in a highly unique and efficient way, while still eliminating wastewater valving problems, and forms a very important part of the invention.

The logic of the hydraulic/pneumatic system's operation is described in our above-referenced copending application, Ser. No. 752,201, now U.S. Pat. No. 4,137,062.

The two operations—wastewater delivery, filtration, and handling of filtrate, on the one hand, and filter paper advancement, on the other—are independent. The paper does not advance once per cycle. To make optimum use of the filter paper 12, it is desirable only to replace the paper at such time as clogging by oils, scums and/or solids cause the paper's filtering rate to drop below an acceptable operating level. This filtering rate, in particular, can be measured in terms of the interval between the application of suction to the trough, and the instant at which the liquid level in the trough reaches a particular height, or it can be measured by a simple flow rate measuring device 76 positioned in the suction/filtrate line 17, as illustrated in FIG. 1. As explained in our above-referenced copending application, when an unacceptably low filtrate flow rate is sensed, filtration is interrupted by closure of the trough suction valve 71 while the filter paper is advanced.

The ultraviolet disinfection unit 22 is shown in greater detail in FIG. 3. The unit 22 is included in the suction-filtrate line 17 immediately downstream of the filtration trough 13, as illustrated in FIG. 1, because (1) the reduced flow rate encountered at this point insures maximum exposure of the fluid to disinfecting radiation; and (2) irradiating the filtrate immediately after filtering assures that no regrowth and agglomeration of organisms (i.e. solids formation), which would compromise treatment efficiency, can occur prior to irradiation. As noted above, ultraviolet treatment is ideally suited to the present process because it is most efficient with effluents having very low suspended solids content. The process of the present invention, as a pre-treatment, is far superior to both septic tanks and secondary treatment (aerobic) systems in that it consistently produces effluents with low suspended solids. Septic tanks and secondary treatment systems, while efficient in solids removal part of the time, periodically produce surges of sludge in their output, opaque to ultraviolet radiation, so that the effluent remains highly polluted despite ultraviolet treatment.

From experiments made with both primary treated (settlement only, as in a septic tank) wastewater and wastewater treated by the process and apparatus of the present invention, the following ultraviolet radiation doses were found to yield equivalent values of disinfection (approximately 9 coliform MPN/100 ml):

Primary treatment: 250,000 $\mu$W/sq. cm.
System described herein: 54,000 $\mu$W/sq. cm.

With paper filtration as the first stage, therefore, ultraviolet treatment of domestic wastewater can be rendered highly energy and cost efficient, far more so than any other disinfection alternative.

A negative count of coliform bacteria is an indication of virtual sterility in an effluent, but is a condition that has heretofore not been achieved in on-site sewage treatment. Using a 65-watt ultraviolet lamp, consuming 60 kilowatt-hours per household-year, the present system has been shown to produce an effluent consistently yielding a negative coliform count.

Ultraviolet treatment in accordance with the invention includes the use of germicidal wavelength ultraviolet radiation, which is radiation having a wavelength in the neighborhood of 2575 Å, for directly killing pathogens by destruction of the DNA of the organism. However, in accordance with the invention the ultraviolet treatment also preferably includes ozone-producing wavelength radiation, which is approximately 1850 Å. The production of ozone directly in the wastewater has the effect of removing odor, reducing color (which inhibits light penetration) and leaving residual hydrogen peroxide in solution to deter subsequent growth of organisms in the treated wastewater.

As FIG. 3 indicates, the unit 22 includes an ultraviolet lamp 80 capable of emitting germicidal wavelength radiation, and preferably also ozone-producing wavelength radiation; a surrounding glass sleeve 81 which will transmit these wavelengths; air tight end seals 82 on the glass sleeve; a cylindrical outer jacket 83 surrounding the glass tube 81, sealed at its ends to the exterior of the glass tube as shown; and the input and output lines 35 and 36, as seen in FIG. 1, for conveying the liquid filtrate into the bottom of the annular space between the sleeve 81 and the jacket 83 and out the top of the space. The space between the ultraviolet lamp 80 and the surrounding glass sleeve 81 is necessary to insulate the lamp from the cooling effect which the flowing liquid would have were it allowed to contact the lamp directly. This space may simply contain air, in which case a "warm-up" period is required before radiation of ozone-producing wavelength is transmitted through the glass sleeve 81 into the liquid filtrate. The warm-up period, which is only a few minutes, is required to convert oxygen within the space immediately surrounding the lamp into ozone to a saturation level. Only when this saturation occurs does the ozone-producing radiation penetrate into the liquid filtrate to an appreciable extent. The germicidal wavelength radiation, on the other hand, is effective much sooner, as soon as the lamp itself "warms up" to operating condition, which requires considerably less time than does the ozone saturation.

Alternatively, the space immediately surrounding the lamp 80 can be evacuated, or filled with another, non-oxygen containing gas, so that the necessity for the ozone saturation warm-up period is eliminated.

As noted above, the germicidal wavelength and ozone-producing wavelength radiation act in concert with one another to dependably eliminate pathogens in the filtrate and control their regrowth.

The system of the invention particularly favors this simple means for introducing ozone into the wastewater, because the suction filtration increases entrained air in the filtrate. At the end of each filtration cycle a surge of air is drawn through the filter paper into the filtrate, adding to entrained air already in the liquid. Of course, the paper filtration also significantly improves ultraviolet penetration by removing almost all suspended solids, thereby maximizing ozone production efficiency in the same way that it maximizes germicidal treatment efficiency.

The efficiency of the ultraviolet radiation may be monitored during use of the system by the use of a photocell sensor 84 positioned on the inside surface of the outer jacket 83, as indicated. The sensor 84 includes appropriate filters to screen out other wavelengths and detect only the ultraviolet wavelength being monitored. This gives an indication of the degree to which the ultraviolet is penetrating the liquid, and if an appreciable degree of opacity occurs, as would be the case if some type of filter failure might occur, the sensor 84 would detect this and the system can be made to shut down until the failure is corrected.

FIG. 4 shows a modification of the ultraviolet unit 22, whereby ozone produced within the space immediately surrounding the ultraviolet lamp 80 may be drawn off and injected at a different location in the system, upstream of the unit 22. Thus, an air inlet 86 may be provided at one end of the glass sleeve 82, with an ozone outlet tube 87 and the other end of the glass sleeve 81. Ozone produced within the glass sleeve may be continuously drawn out through the tube 87 and injected, for example, at an ozone inlet 88 in the wastewater line 50, just upstream of the buffer reservoir 15, as indicated in FIG. 1. Alternatively, the ozone may be injected at an inlet 89 in the filtrate/suction line 17, just upstream of the ultraviolet unit 22. This can be beneficial in that it deodorizes and removes color from the wastewater before it reaches the ultraviolet unit 22, thereby providing for greater clarity, and increases effectiveness of the ultraviolet radiation acting upon the filtrate within the unit 22. The ozone thus produced may be injected into the inlet 88 or the inlet 89 by a venturi arrangement (not shown) or by simply forcing it into the stream, as by elevating the pressure of the ozone via a small blower, etc.

Figure 5:
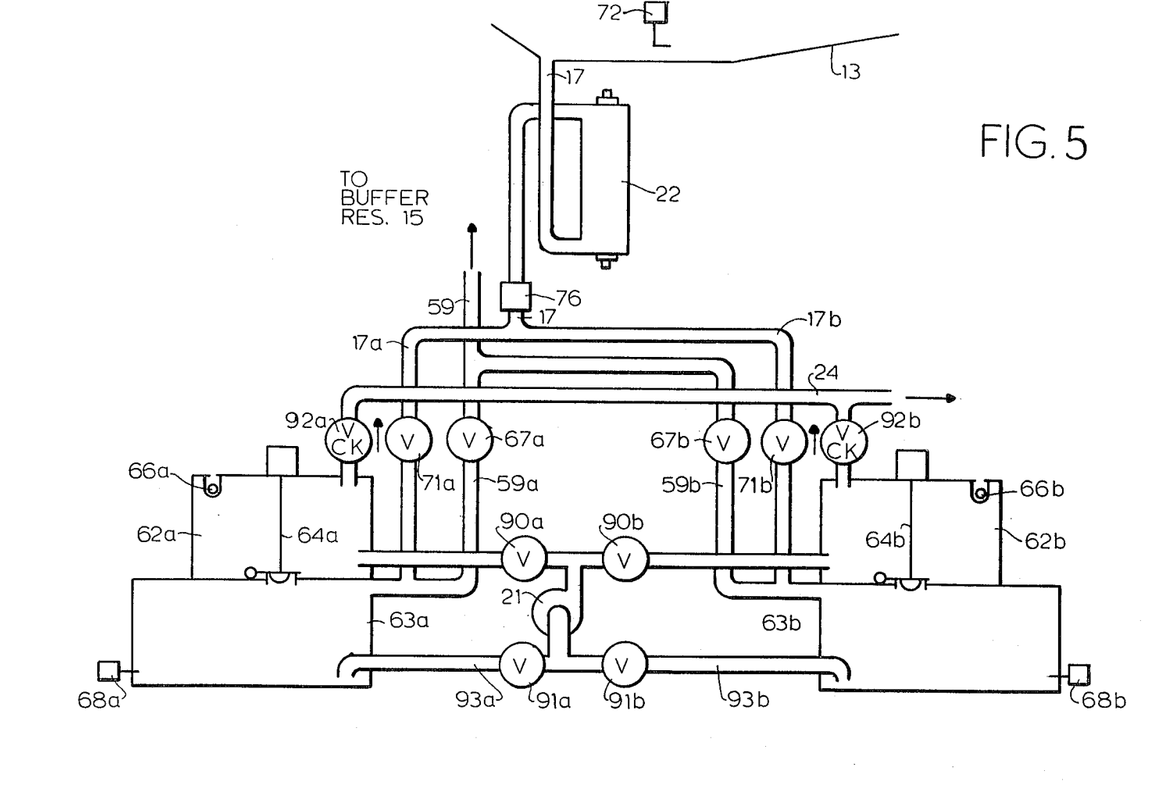
FIG. 5 is a schematic view showing a modification of the process and apparatus of FIG. 1.

FIG. 5 shows an alternate form of pneumatic/hydraulic system for the apparatus and method of the invention, whereby the throughput of wastewater treatment may be approximately doubled. Essentially the modified system of FIG. 5 includes duplicate power and return filtrate reservoirs 63 and 62, with additional controlled valves, so that filtration can continue while additional wastewater is drawn into the buffer reservoir and while the supply of vacuum for filtration suction is re-charged. This permits filtration to be maintained continuously (except when the filter medium clogs, necessitating advancement of fresh medium), so long as there is wastewater to be filtered. The modified system is thus capable of serving a larger number of households, as much as double capacity, with less than a 20% increase in the cost and volume of components.

The hydraulic/pneumatic system depicted in FIG. 5 of the above-referenced copending application Ser. No. 752,201, now U.S. Pat. No. 4,137,062, and the system described herein in connection with FIG. 1, are adequate for processing wastewater loads of from 150 to 1000 gallons per day, which, for household sewage applications, corresponds to from one to seven households. However, for more intensive use of the process, the described systems have certain inherent inefficiencies which prevent the full potential of the working elements from being exploited. These inefficiencies relate to two factors:

(1) The paper filtration stage, which is the bottleneck of process throughput, is not in use during a portion of the process cycle and therefore is to some degree wasted.

(2) The pump used as the power source for the process is also used during only a portion of the cycle and is therefore also somewhat wasted. Moreover, the pump is cycled on and off during each process cycle which, for intensive use, subjects the pump (and starting components in the case of capacitor-start single-phase AC motors) to significant wear.

The variation described with reference to FIG. 5 herein uses similar component tank and valve elements as above, but in duplicity and with a modified control sequence such that the following objectives are achieved:

(1) The trough can be kept constantly filled and under suction, providing continuous filtration except during filter conveyor advances.

(2) The pump can be utilized a greater portion of the time, with no on-off cycles as long as wastewater is available for processing. In addition to approximately doubling the process throughput with little cost or size increase, these modifications enable the same modular components to be utilized as in the lower capacity version described above and in the above-referenced copending application, allowing the same "building blocks" to be used to synthesize systems having capacities from 150 to over 4000 gallons per day.

FIG. 5 depicts schematically all elements of the present invention involved in generating the suctions needed for pneumatic lift of wastewater to the trough, suction of filtrate through the paper filter, and delivering hydraulic pressure to the processed liquid. Included are two identical subsystems designated by suffixes a and b, each having similar elements as described above in reference to FIG. 1 and as disclosed in our above-referenced copending application. The two subsystems share a common centrifugal pump 21 through a new valving arrangement. This higher-capacity system may be used advantageously with the other improvements described above, particularly the ultraviolet disinfection system, but does not necessarily include these features.

FIG. 5 shows lower or power reservoirs 63a and 63b, upper or return reservoirs 62a and 62b, dump valve assemblies 64a and 64b, venting float ball valves 66a and 66b, trough suction valves 71a and 71b, buffer suction valves 67a and 67b, pump valves 90a, 90b, 91a and 91b, centrifugal water pump 21, output check valves 92a and 92b for preventing crossover, common process output line 24, pump input lines 93a and 93b, pump output lines 94a and 94b, liquid level switches 68a and 68b, branch buffer suction lines 59a and 59b and common buffer suction line 59 having a buffer vent valve 60 at its upper end (not shown—see FIG. 1), trough suction/filtrate line 17 and branches 17a and 17b, flow switch 76, ultraviolet disinfection unit 22, trough 13 and trough liquid level switch 72. Similar reference numbers are used for components similar to those described above in connection with FIG. 1.

From this system of tanks and valves emerge a single buffer suction line 59 connected to a buffer reservoir (not shown) similar to the reservoir 15 of FIG. 1. The system also includes a wastewater delivery input line like the line 50 of FIG. 1, through which wastewater is drawn, and preferably a swing gate check valve in the line, similar to the valve 75.

Figure 6:
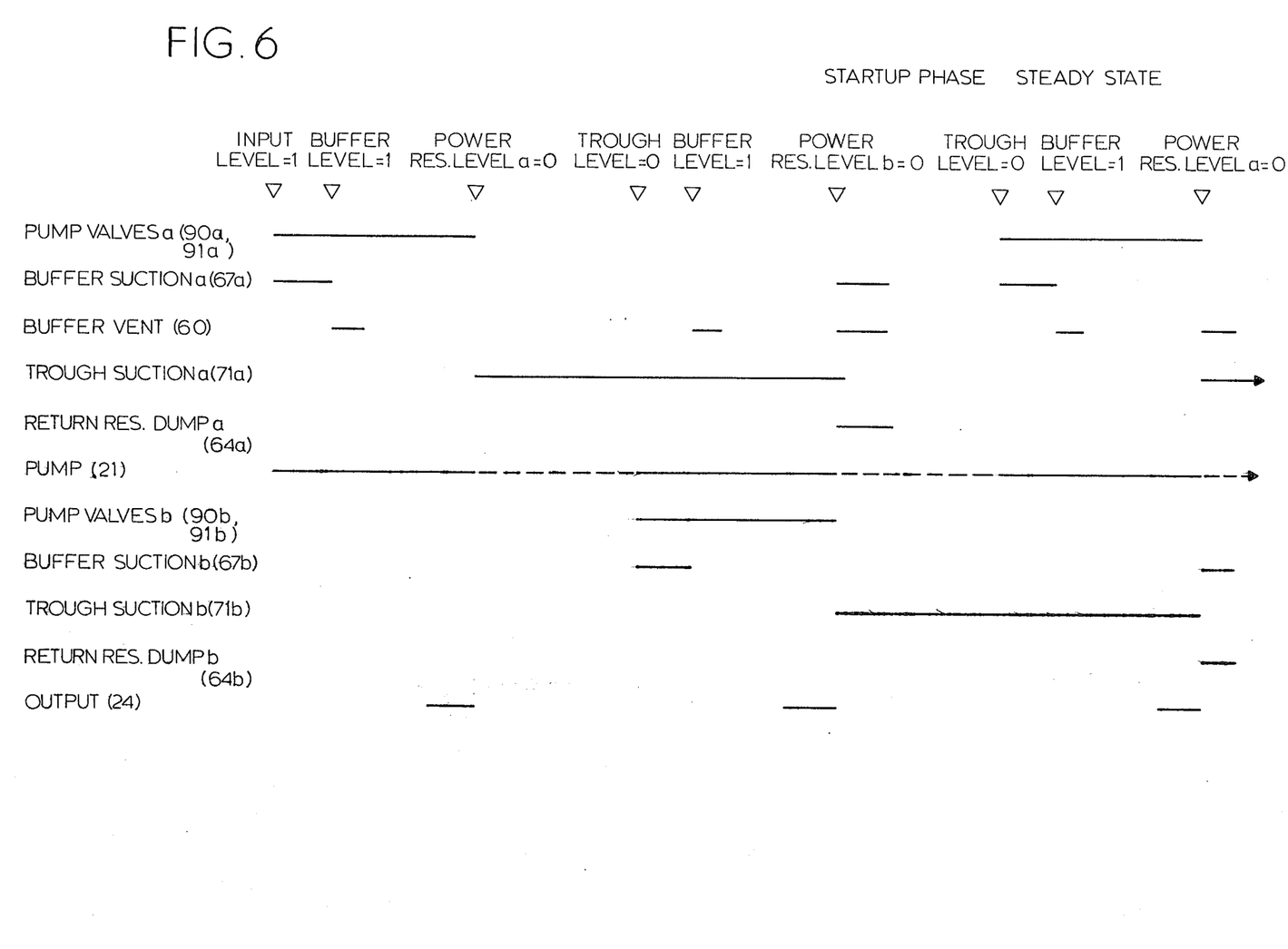
FIG. 6 is a control sequence chart indicating the operation of the FIG. 5 embodiment.

FIG. 6 shows the control sequence of events for the system shown in FIG. 5, including the energized states of all valves, which preferably are normally closed and are shown as such, and the active states of the pump 21 and the output line 24. For proper functioning of this control sequence, the trough liquid level switch 72 is to be positioned at an intermediate position in the trough volume, i.e. higher than in the FIG. 1 embodiment, and the trough flow switch 76 has a flow rate threshold corresponding to a clogged filter. To simplify understanding, the control sequence shows operation in the absence of a filter clogging condition; the latter circumstance will be discussed separately.

At the beginning of operation, both power reservoirs 63a and 63b are nearly full, the return reservoirs 62a and 62b having been dumped into the power reservoirs (via the valves 64a and 64b) at the end of the previous a and b cycles. The process begins at such time as the liquid level switch 53 in the input line 50 (not shown—see FIG. 1) is triggered (input level=1), causing actuation of the pump 21, and opening of pump valves 90a and 91a, and of buffer suction valve 67a. This causes power reservoir 63a to be depleted and return reservoir 62a to be filled, over a period of time ending with power reservoir a=0 on the chart. The initial vacuum thereby generated in 63a by the pumpdown is conveyed to buffer tank 15 (see FIG. 1) through buffer suction line 59, causing wastewater to be pneumatically lifted into the buffer tank. This process continues until the buffer tank liquid level switch 58 (FIG. 1) is actuated (buffer level=1 on the chart), at which time buffer suction valve 67a is closed and buffer vent valve 60 opens for a short time, releasing the buffer dump valve (see FIG. 1) and causing a measured batch of wastewater to be dumped into the trough 13. Power reservoir 63a is at this time sealed off at the valve 67a, but valves 90a and 91a remain opened, causing processed wastewater to continue to fill return reservoir 62a, and causing an increasing vacuum to be accumulated in power reservoir 63a. At some point in the continued pumping, the reservoir 62a will be filled, closing float ball valve 66a and thence causing processed wastewater to be forced out under pressure through check valve 92a and output line 24.

After approximately one batch volume of processed wastewater is output through line 24, power reservoir 63a will have been emptied, causing liquid level switch 68a to trigger the closure of pump valves 90a and 91a, and to open trough suction valve 71a, thereby applying suction to the filter trough. This is the point where power reservoir level a=0 on the chart. At this point, the pump 21 becomes inactive, as indicated by the dashed line on the chart of FIG. 6. However, it is preferably kept running since it is a centrifugal pump and is better kept operating during periods when it is valved off than being turned on and off repeatedly. As wastewater is drawn through the filter, the liquid level in the trough will recede until, at an intermediate level, the trough level switch 72 will be deactivated (trough level=0 on the chart, but the trough is not empty). At this time pump valves 90b and 91b are opened, initiating the same sequence of events for reservoir system b as was just concluded for reservoir system a. In this manner a second batch of wastewater is delivered to the trough before the first one has been fully evacuated. When power reservoir 63b has been evacuated as sensed by liquid level switch 68b, suction to the trough is switched from power reservoir 63a to 63b by the simultaneous opening of trough suction valve 71b and closing of 71a. This transfer occurs before power reservoir 63a has been totally depleted of its vacuum, and therefore the filling and evacuation of the trough is allowed to proceed continuously.

At the point of switching suction from power reservoir 63a to 63b (power reservoir b=0 on the chart), the dumping of liquid stored in the return reservoir 62a, down into the power reservoir 63a, may be initiated. This involves the brief activation of the return reservoir dump valve 64a, with simultaneous venting of the power reservoir 63a by brief opening of the buffer suction and buffer vent valves 67a and 60, as indicated on the chart. The return reservoir 62a is vented by the ball valve 66a. Thus, the power reservoir 63a is restored to its initial nearly filled state for use in the next cycle.

From this time henceforth, the process will be a repetition of the above sequence with the valve system alternating between reservoir systems a and b. During this time the pump preferably is running continuously, as noted above, although for a portion of the process sequence—specifically, between the drawdown of one power reservoir and subsequent drawdown of the trough to the liquid level switch threshold—the pump flow is valved off. By properly mating the pump characteristics to the trough flow rate and by minimizing the interval needed for dumping the contents of the return reservoirs, as is accomplished by venting, the effective duty cycly of the pump can be maximized.

When the input level switch 53 (FIG. 1) determines that additional wastewater is not presently available for treatment, the following pumping cycle is cancelled, i.e. the pump valves and buffer suction valve for the next cycle are not opened, and additional wastewater is not delivered to the buffer reservoir. The pump is shut off. However, suction filtration continues until the contents of the trough are depleted and drawn into one of the power reservoirs. When filtrate flow rate at the flow switch 76 drops to or near zero, the contents of the return reservoir are dumped into the active power reservoir, so that both power reservoirs are nearly filled for the next cycle.

During normal operation of the system, the flow switch 76 is not involved. The switch is solely used to monitor clogging of the paper filter. Since during normal operation, paper filtration is normally continuous, any interruption of flow from a prescribed flow rate can be interpreted as filter clogging. The intended response to this is to close the trough suction valve in use at the time, advance the conveyor a given increment, then restore trough suction. The choice of flow threshold for the flow switch 76 is a compromise between filter paper consumption and process throughput.

To those skilled in the art to which this invention relates, these and many other such changes in construction and widely differing embodiments and applications of the invention will suggest themselves without departing from the spirit and scope of the invention. The disclosures and the description herein are purely illustrative and are not intended to be in any sense limiting.

We claim:

1. A process for treating fresh sewage containing organic liquid and solid wastes, comprising:
    separating the solids from the liquids by filtration while the sewage is fresh, through an organic compostible filter medium, thereby providing a liquid filtrate low in suspended solid material;
    composting the solids along with used filter medium;
    exposing the liquid filtrate to ultraviolet radiation, to destroy pathogens; and
    dispersing the nutrient rich filtrate to unsaturated ground.

2. The process of claim 1 which further includes applying suction to the filtrate side of the filter medium.

3. The process of claim 1 wherein the separation of solids from liquids comprises filtration through paper filter medium.

4. The process of claim 3 which further includes applying suction to the filtrate side of the filter medium and filtering the sewage in cycles, with air drawn through the filter medium at the end of each filtering cycle, thereby introducing substantial entrained air to the filtrate liquid.

5. The process of claim 4 wherein the step of exposing the filtrate to ultraviolet radiation includes irradiation with ultraviolet including ozone-producing wavelength to convert much of the oxygen in the entrained air of the filtrate to ozone, which reacts with pathogens in the liquid to form stable compounds, and leaves residual hydrogen peroxide in the liquid which deters subsequent growth of organisms.

6. The process of claim 5 wherein the conversion of oxygen to ozone is accomplished by irradiating a closed air space immediately surrounding an ultraviolet source lamp until the air space contains ozone at a saturation level, then continuing the ultraviolet radiation, while causing the liquid filtrate to flow adjacent to and exterior of the air space, to thereby irradiate and convert oxygen in the filtrate to ozone.

7. The process of claim 5 wherein the conversion of oxygen to ozone is accomplished by directing radiation from an elongated ultraviolet source lamp through a closed substantially evacuated space immediately surrounding the lamp to a further space, surrounding the evacuated space, through which the liquid filtrate is caused to flow in surrounding relationship to the elongated lamp.

8. The process of claim 1 wherein the step of exposing the liquid filtrate to ultraviolet radiation includes exposure to both germicidal wavelength ultraviolet radiation and for directly destroying pathogens, and ozone-producing wavelength, for converting oxygen of entrained air of the filtrate into ozone, which reacts with pathogens to form stable compounds and leaves residual hydrogen peroxide in the liquid to deter subsequent growth of organisms.

9. The process of claim 1 wherein the step of exposing the liquid filtrate to ultraviolet radiation comprises irradiating an air space immediately surrounding an ultraviolet source emitting both germicidal and ozone-producing ultraviolet wavelengths, while causing the liquid filtrate to flow adjacent to and exterior of the air space, thereby directly destroying pathogens with the germicidal wavelength radiation, and further including drawing off ozone produced in the air space and injecting it into the unfiltered fresh sewage, thereby partially treating the raw sewage and bleaching the liquids, so that the ultraviolet radiation of the filtrate is more effective.

10. The process of claim 1 which further includes applying suction to the filtrate side of the filter medium, through a suction line through which the filtrate travels, with the ultraviolet radiation being applied to the liquid filtrate within the suction line, just downstream of the filtration step where the filtrate flow rate is slow, so that exposure to the ultraviolet radiation is maximized.

11. The process of claim 10 wherein the ultraviolet radiation step includes radiation of the filtrate with ultraviolet of both germicidal wavelength, for directly destroying pathogens, and ozone-producing wavelength, for converting oxygen of entrained air in the filtrate into ozone, which reacts with pathogens to form stable compounds and leaves residual hydrogen peroxide in the liquid to deter subsequent growth of organisms.

12. The process of claim 11 wherein the filtration is performed in successive cycles, with air drawn through the filter medium by the suction at the end of each filtering cycle, thereby increasing the entrained air in the filtrate for production of ozone.

13. The process of claim 1 wherein the step of exposing the liquid filtrate to ultraviolet radiation comprises directing radiation from an elongated ultraviolet source lamp outwardly into an elongated enclosure surrounding the lamp, while directing liquid filtrate through the elongated enclosure, and further including sensing the quantity of ultraviolet radiation transmitted through the filtrate by means of a sensor at the outer wall of the enclosure, thereby providing an indication of the thoroughness of the ultraviolet radiation.

14. A process for treating fresh sewage containing organic liquid and solid wastes, comprising:
    separating the solids from the liquids by filtration through a paper filter medium while the sewage is fresh, and producing a liquid component low in suspended solid material;
    directing the liquid component immediately through a filtrate outlet line just downstream of the filter medium;
    exposing the liquid component, flowing through the filtrate outlet line at generally the flow rate of the filtration, to ultraviolet radiation including germicidal wavelength, to destroy pathogens but not beneficial nutrients present in the liquid component;

introducing ozone in the liquid component to react with pathogens to form stable compounds and to produce residual hydrogen peroxide for deterring subsequent pathogen growth; and dispersing the nutrient-rich treated liquid component to unsaturated ground.

15. A process for treating fresh sewage containing organic liquid and solid wastes, comprising:

separating the solids from the liquids while the sewage is fresh, through an organic compostible filter medium, to produce a liquid component low in suspended solid material;

exposing the liquid component to ultraviolet radiation including germicidal wavelength, to destroy pathogens but not beneficial nutrients present in the liquid component;

introducing ozone in the liquid component to react with pathogens to form stable compounds and to produce residual hydrogen peroxide for deterring subsequent pathogen growth;

dispersing the nutrient-rich treated liquid component to unsaturated ground; and composting the separated solids along with used filter medium.

16. A method of treating wastewater wherein wastewater is delivered to a holding tank above a filter medium, then is filtered through the filter medium with suction applied below the medium comprising:

providing, below the filter medium, a filtrate reservoir connectable with the filtrate side of the medium;

pumping stored filtrate out of the reservoir, thereby creating a suction in the reservoir;

connecting the reservoir with the holding tank near its top, to transfer suction thereto and to draw a charge of wastewater into the holding tank;

releasing the charge of wastewater from the holding tank to the filter medium;

disconnecting the reservoir from the holding tank and connecting it through a suction filtrate line to an enclosure at the filtrate side of the filter medium, thereby to increase the filtration rate of the filtration cycle and refill the reservoir with filtrate; and exposing the liquid filtrate to ultraviolet radiation while it is in the filtrate suction line, just downstream of the filter medium, to destroy pathogens, whereby efficiency of the ultraviolet radiation is maximized by immediate irradiation, before significant pathogen growth, agglomeration and solids formation can occur and by irradiation at a location of low filtrate flow rate.

17. The method of claim 16 wherein the step of exposing the liquid filtrate to ultraviolet radiation includes exposing the filtrate to both germicidal and ozone-producing ultraviolet radiation, so that the filtrate is purified by direct destruction of pathogens as well as by the production of ozone from entrained air in the filtrate, the ozone being effective to react with pathogens to form stable compounds and to leave residual hydrogen peroxide in the liquid to deter subsequent growth of orgnaisms.

18. The method of claim 16 wherein filtration is continuous, including:

providing a second filtrate reservoir similar to the first;

while filtration is proceeding with the first reservoir connected to the filtrate enclosure, before filtration of that charge of wastewater is completed, pumping stored filtrate out of the second reservoir, thereby creating a suction in the second reservoir;

connecting the second reservoir with the holding tank near its top to transfer suction thereto and to draw a second charge of wastewater into the holding tank;

releasing the charge of wastewater from the holding tank to the filter medium;

while filtration continues, disconnecting the second reservoir from the holding tank and connecting it through the suction filtrate line to the enclosure at the filtrate side of the filter medium, while simultaneously disconnecting the first reservoir from the enclosure; and repeating the cycle, commencing with pumping stored filtrate out of the first reservoir.

19. The method of claim 18, including using a single pump for both pumping steps of the cycle, and running the pump continuously during operation through successive cycles, with the pump valved off during periods when it is not pumping stored filtrate.

20. The method of claim 18, further including the step of returning a portion of the pumped liquid to each reservoir after the reservoir has been disconnected from the filtrate enclosure to increase the volume of filtrate subsequently to be pumped out, thereby increasing the amount of vacuum which may be generated by the pumping.

21. Apparatus for treating fresh sewage containing organic liquid and solid waste, comprising:

filtering means for separating the solids from the liquids while the sewage is fresh, and for producing a liquid filtrate low in suspended solid material, including means providing for filtration of the sewage in successive cycles and means for applying suction to the filtrate side of the filter medium and for drawing a charge of air through the filter medium at the end of each filtering cycle, thereby introducing substantial entrained air to the filtrate liquid;

means for removing the solids along with used filter medium;

means just downstream of the filter medium for exposing the liquid filtrate to ultraviolet radiation, to destroy pathogens, said ultraviolet radiation including ozone-producing ultraviolet wavelength for converting much of the oxygen in the entrained air of the filtrate to ozone, which reacts with pathogens in the liquid to form stable compounds and leaves residual hydrogen peroxide in the liquid for deterring subsequent growth of organisms; and means for dispersing the nutrient-rich filtrate to unsaturaged ground.

22. A continuous wastewater filtration process including a method of delivering wastewater to a holding tank above the filter medium, which holding tank is connected to a source of wastewater below and of providing suction to the filtrate side of the filter medium, comprising:

providing at a location below the height of the filter medium, a pair of filtrate reservoirs connectible with the filtrate side of the medium;

pumping stored filtrate out of the first reservoir, thereby creating a suction in the first reservoir;

connecting the first reservoir with the holding tank near its top to transfer suction thereto and to draw a charge of wastewater into the holding tank;

releasing the charge of wastewater from the holding tank to the filter medium;

disconnecting the first reservoir from the holding tank and connecting it to an enclosure at the filtrate side of the filter medium, thereby to increase the filtration rate of the filtration cycle and refill the first reservoir with filtrate;

while filtration is proceeding with the first reservoir connected to the filtrate enclosure, before filtration of that charge of wastewater is completed, pumping stored filtrate out of the second reservoir, thereby creating a suction in the second reservoir;

connecting the second reservoir with the holding tank near its top to transfer suction thereto and to draw a second charge of wastewater into the holding tank;

releasing the second charge of wastewater from the holding tank to the filter medium;

while filtration continues, disconnecting the second reservoir from the holding tank and connecting it to the enclosure at the filtrate side of the filter medium, while simultaneously disconnecting the first reservoir from the enclosure; and repeating the cycle, commencing with pumping stored filtrate out of the first reservoir while filtration is proceeding with the second reservoir connected to the filtrate enclosure.

23. The process of claim 22, including using a single pump for both pumping steps of the cycle, and running the pump continuously during operation through successive cycles, with the pump valved off during periods when it is not pumping stored filtrate.

24. The process of claim 22, further including the step of returning a portion of the pumped liquid to each reservoir after the reservoir has been disconnected from the filtrate enclosure to increase the volume of filtrate subsequently to be pumped out, thereby increasing the amount of vacuum which may be generated by the pumping.

25. The process of claim 22, further including exposing the liquid filtrate, in its passage between the filter medium and the reservoir, to ultraviolet radiation, to destroy pathogens.

26. The process of claim 25 wherein the step of exposing the liquid filtrate to ultraviolet radiation includes exposure to both germicidal wavelength ultraviolet radiation for directly destroying pathogens, and ozone-producing wavelength, for converting oxygen of entrained air of the filtrate into ozone, which reacts with pathogens to form stable compounds and leaves residual hydrogen peroxide in the liquid to deter subsequent growth of organisms.

27. Apparatus for continuous separation of solid wastes from liquid wastes in wastewater, comprising:

filtering means for receiving fresh wastewater and separating it into solid wastes and liquid filtrate wastes, with an enclosure at the filtrate side of the filtering means;

a wastewater inlet line from a source of fresh wastewater;

a buffer tank positioned over the filtering means and at an elevated position above the inlet line, with a bottom outlet positioned over the filtering means;

a riser pipe connecting the inlet line with an inlet near the top of the buffer reservoir;

first and second power reservoirs positioned below the filtering means; and pump means for selectively pumping stored liquid out of the first power reservoir or out of the second power reservoir, thereby creating a suction in the respective reservoir;

means for selectively connecting one of the power reservoirs with the buffer tank, near its top, to draw a charge of wastewater into the tank;

means for releasing the charge of wastewater to the filtering means when the buffer tank is filled;

means for selectively connecting one of the power reservoirs with the enclosure at the filtrate side of the filter medium;

means for sensing a preselected intermediate level of wastewater on the filtering means, prior to the completion of filtration of a charge of wastewater;

whereby suction caused by pumpdown of the first power reservoir may be first applied to the buffer tank to draw in a first charge of wastewater, which is then released to the filtering means, then the suction may be applied to the filtering means enclosure to increase the rate of filtration and to direct filtrate into the first power reservoir, then, when said preselected intermediate level of wastewater on the filtering means is sensed, stored liquid may be pumped from the second power reservoir to create suction therein, which may be applied to the buffer tank to draw in a second charge of wastewater, which is released to the filtering means, and while filtering proceeds, suction from the first reservoir may be disconnected while suction from the second reservoir is applied to the filtering means enclosure, and the cycle may be repeated, providing continuous filtration of the wastewater.

28. The apparatus of claim 27 which further includes, for each power reservoir, means for storing and returning a portion of the pumped filtrate to the power reservoir to increase the volume of liquid therein for the following pumping cycle, so that a greater vacuum may be generated in said following pumping cycle.

29. The apparatus of claim 28 wherein the storing and returning means comprises a return reservoir positioned above the power reservoir and in communication with the pump conduit downstream of the pump, and a selectively openable return conduit from the bottom of the return reservoir to the power reservoir.

30. The apparatus of claim 27, further including disinfecting means for exposing the liquid filtrate to ultraviolet radiation, to destroy pathogens while leaving beneficial soil nutrients in the filtrate.

31. The apparatus of claim 30 wherein said ultraviolet radiation includes both germicidal and ozone-producing wavelength.

* * * * *